United States Patent Office 3,339,750
Patented Sept. 5, 1967

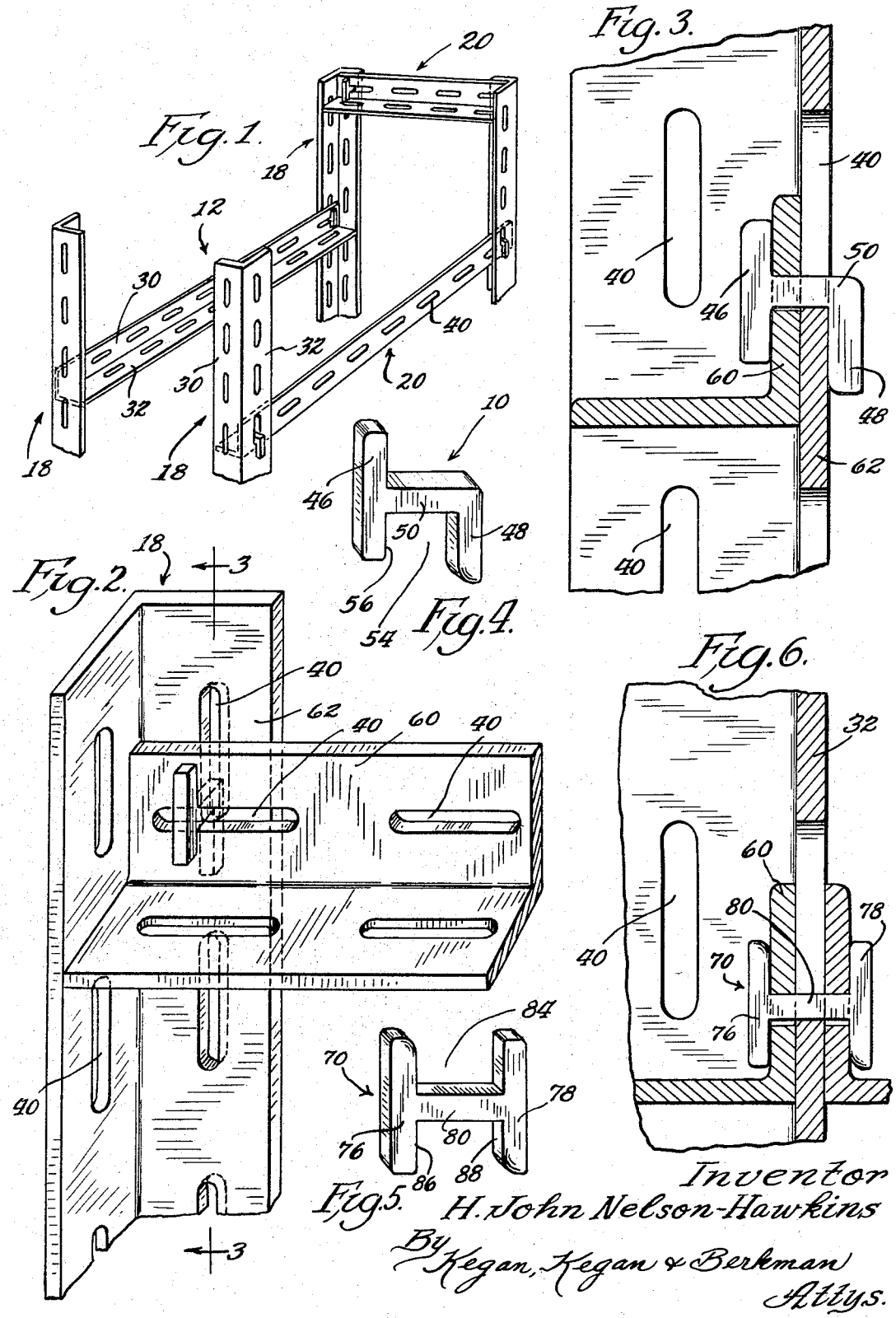

3,339,750
STRUCTURAL CONNECTOR
Horatio John Nelson-Hawkins, Park Ridge, Ill., assignor to Hana Corporation, a corporation of Illinois
Filed Aug. 9, 1965, Ser. No. 478,229
2 Claims. (Cl. 211—176)

ABSTRACT OF THE DISCLOSURE

A structural key or joinder means for interconnecting slotted angle irons to provide a load-supporting framing structure or rack, the key being characterized in that it comprises a pair of parallelly extending legs integrally formed with a transversely extending cross-leg to define a downwardly opening generally U-shaped anchor slot, whereby the cross leg extends horizontally through superimposed overlapping intersecting slots of contiguous flanges of the slotted angle irons and the parallelly extending legs of the key extend vertically along and closely and firmly abut opposite outside surfaces of the flanges to retain the angle irons in positive load-supporting engagement.

---

This invention relates generally to storage racks, supports for shelving, and framing structures finding utility as deck and partition assemblies. More particularly, the invention is directed to a novel structural connector, clip element, or fastener for firmly and rigidly securing together, in a releasable manner, the upright framing members and horizontal stringers or rails which form the completed racks or framing structures. The connector of the invention provides, in combination with the cooperating posts and cross members, structures of desirable rigidity, stability and load-bearing strength.

In a preferred embodiment of the invention the major structural elements consist of angle irons which are generally L-shaped in cross section. Such framing and support members have been widely used in the prior art and have been joined or interconnected to one another through various means and techniques. In many installations conventional nuts and bolts have been used; in other cases, the framing members have been welded to one another. In still other cases special brackets or hangers have been used. The resulting final structures have taken somewhat varied physical forms and have relied upon many fabrication techniques and assembly procedures.

In spite of the long time need, and notwithstanding the extensive research and development in the relevant art, no completely satisfactory rack or framing structure has heretofore been produced. Each prior art physical embodiment has one or more undesirable or objectionable features. Fastening by means of nuts and bolts is a time-consuming and tedious procedure. Moreover, such joinder elements tend to loosen, and fail to provide the desired stability and rigidity. Small keys, wedges, hangers, and similar fittings are easily sheared by heavy loading and often project, undesirably, from the outer faces of the rack components. While welding effects stable connections between the framing members of storage racks and the like, the final product produced is not susceptible to disassembly or dismantling and rearrangement—a procedure often highly desirable. It is the aim of this invention to provide an effective solution for the problems set forth above and for related problems to the end that an improved framing structure or rack may be realized.

The present invention, therefore, is directed to and has for one of its objects, the provision of connector means for simply, firmly, and securely fastening together component elements of storage racks, shelving supports, decks, and partitions and the like.

It is a principal object of the invention to provide a novel key or connector adapted for use with slotted angle irons and the like to provide a high-strength, stable interconnection between such angle irons.

It is a related object of the invention to provide knockdown racks which can be erected and dismantled rapidly and with extreme ease and which necessitate no special tools or mechanical techniques.

It is another object of this invention to provide simple mechanical means whereby the various component structural elements of racks and the like may be secured to each other or to adjacent structures in a simple and detachable manner to provide great flexibility and ease of rearrangement, if desired, without the employment of special skills or special tools.

It is still a further object of this invention to provide a boltless connector means for joining and retaining in fixed disposition the vertical posts and horizontal stringers of rack structures and the like.

Still another object of the invention is to provide an inexpensive, high-strength, easily assembled rack or framing structure which satisfies and meets all engineering demands and also presents an attractive and neat appearance.

Yet another object of the invention is to provide an improved framing structure in which the versatility of a slotted angle iron is combined with a novel connector specially engineered and fabricated to couple the slotted angle irons at overlapping intersecting slots thereof.

It is a related object of the invention to provide a key-like clip or connector for interjoining slotted angle irons and in which parallelly disposed legs of the connector are spaced to conform with the through thickness of overlapping webs of the angle irons to be connected.

Still another object of the invention is to provide a connector for slotted angle irons and the like, which connector is rotated with respect to the slotted angle irons during insertion through overlapping intersecting slots thereof to preclude inadvertent displacement of the connector from the completed assembly.

Other aims, objects, and advantages will become apparent from a reading of the following specification taken in conjunction with the drawings in which:

FIGURE 1 is a fragmentary perspective view of a rack, the elements of which are secured together by the improved connector of this invention;

FIGURE 2 is an enlarged fragmentary perspective view of two slotted angle irons joined by means of the novel connector;

FIGURE 3 is a vertical sectional view taken substantially on the line 3—3 of FIGURE 2 through the joined angle irons;

FIGURE 4 is a perspective view of the connector or clip of the invention;

FIGURE 5 is a perspective view of a second embodiment of the connector of the invention; and FIGURE 6 is a vertical sectional view indicating the mode of utilizing the connector of FIGURE 5.

The aims and objects of the invention are accomplished by providing in a rack or framing structure angle irons having longitudinally spaced elongated slots and adapted to be placed in overlying or overlapping arrangement in a manner to permit the insertion through overlapping portions of the slots the improved connector of the invention. In the final assembly, the opposed parallel legs of the connector contiguously abut corresponding outer surfaces of the joined angle irons while the crossbar of the connector extends through the communicating slots, as illustrated in FIGURE 3. In the arrangement described, one elongated slot is disposed transversely with respect to and over a slot of a contiguous flange so that both vertical and lateral movements of the cross-bar and therefore, of the connector, are precluded.

Referring now more particularly to the drawings, for purposes of disclosure, the structural connector 10 of the invention is shown employed in the assembly of a rack or frame 12. The rack 12, in the simple form illustrated in FIGURE 1, is fabricated of slotted angle irons 16 which form not only the legs or posts 18 but also the horizontal stringers 20 which interconnect the vertical posts to each other. The slotted angle irons 16 are preferably L-shaped in cross-section and, in the preferred embodiment of the iron illustrated, the two transversely disposed and longitudinally extending intersecting flanges or webs 30 and 32 of the angle irons are of substantially equal widths. The flanges of the angle irons are stamped or otherwise formed to provide longitudinally spaced elongated slots 40, as illustrated most clearly in FIGURE 2. The width or transverse dimension of the slots 40 is slightly greater than the through thickness of the stock from which the structural connector 10 of the invention is fabricated. To provide increased versatility, the elongated slots 40 are preferably provided in both transversely disposed flanges 30 and 32 of each structural member.

The clip or structural connector 10, as illustrated in the preferred embodiment shown in FIGURE 4, comprises a pair of spaced parallelly extending legs 46 and 48 of rod-like configuration and preferably rectangular in transverse section, the legs 46 and 48 being joined and integrally formed with a transversely extending shank, bar, rod, or cross-leg 50. In one particular preferred embodiment, the clip is generally h-shaped, the cross-leg 50 extending between and connecting an end of one leg 48 to a position intermediate the ends of the other leg 46 so that the connector legs and cross-leg define a downwardly opening U-shaped slot 54. For reasons which are believed to be apparent from the drawing and which will be discussed below, the distance between inner facing surfaces 56 and 58 of the legs 46 and 48 is substantially equal to but slightly greater than the combined thicknesses of overlying webs or flanges 60 and 62 (FIGURE 3) to be joined. It is obvious that where three or more webs are to be connected, the spacing between opposed legs 46 and 48 of the connector is accordingly incrementally increased.

While in the preferred embodiment of the connector illustrated in FIGURE 4 the structural form is generally h-shaped, it is possible that connectors having an H-shape, as shown in FIGURE 5, may also be used. In such a structural variation the "upper" leg portion of one side of the H connector would, in the final assembled structure of the rack or frame, overlie a slot and thus fail to contribute to the stability of the composite structure. However, in connecting three thicknesses or flanges, as illustrated in FIGURE 6, the H form of the connector would serve a highly useful purpose.

The H-shaped connector 70 illustrated in FIGURE 5 comprises spaced, parallel, substantially co-extensive opposed legs 76 and 78 joined through an integral cross-leg 80 extending between the legs 76 and 78 and connected thereto at positions substantially equi-distant from opposed ends of the legs. As in the case of the connector 10 previously described, the H connector is fabricated to define elements which are substantially rod-like and are preferably rectangular in cross-section. While the H-shaped connector may be used in place of the h-shaped connector, in the manner shown in FIGURE 3, the bilaterally symmetrical H-connector finds special utility in interconnecting three overlying flanges as illustrated in FIGURE 6. It is obvious that for a given flange thickness an H-connector used to join three flanges will have a slot 84 of corresponding width.

The manner in which the h-connector engages and couples the flanges 60 and 62 is clearly seen in FIGURES 1, 2 and 3. Referring more particularly to FIGURE 2, it is clearly evident that in assembling a pair of flanges through the use of the h-connector, it is necessary merely first to insert the shorter leg 48 through a slot 40 of the angle iron, then to rotate the connector 90° about the cross-leg 50 to present the leg 48 to extend downwardly, and to insert the short leg 48 through a second slot 40 of the second channel iron web 62. The first channel iron is then moved downwardly together with the h-connector 10 until the cross leg 50 of the connector bottoms at the lower limit of the longitudinally and vertically extending slot 40 in the leg or post 18 formed by the vertically positioned angled iron. The resulting final assemblage is clearly illustrated in FIGURE 3.

The procedure for assembling a three-panel structure such as illustrated in FIGURE 6 is similar to that described above except that a third step is required in order to egage the third flange element.

The boltless connection effected between the flanges through the use of the connector of the invention is rendered especially firm and rigid by the even contact of the straight vertical face portions 56 and 58 (and 86 and 88) of the inner surfaces which define the panel receiving slot 54 (and 84) of the connector. Strong, rigid, and swayless structure is achieved.

While, for purposes of disclosure, specific preferred embodiments of the invention have been illustrated and described in detail, many changes, modifications and variations may be made without departing from the spirit of the invention, and all such changes, modifications and variations are included within the appended claims.

What is claimed is:

1. In a storage rack, a frame including upright front and rear posts, and stringers extending horizontally between and interconnecting said front posts to each other and said rear posts to each other and to said front posts;

said posts and said stringers being formed from sheet metal and consisting of angle irons substantially L-shaped in section as viewed transversely of longitudinal axes thereof;

said posts and said stringers having formed transversely therethrough longitudinally spaced elongated through slots, a pair of slots in contiguously contacting walls of said posts and said stringers overlying and intersecting each other to provide a key-receiving through channel;

a high strength, rigid, deformation-resisting connector key extending through said channel formed by said intersecting slots and embracing said walls and interconnecting said stringers to said posts;

said connector key being generally h-shaped in form and comprising a pair of spaced parallel legs and an integrally formed connecting web extending between and transversely of said legs and coplanar therewith;

through thickness of said key as measured in a plane defined by said legs and said web being slightly less than transverse breadth of said elongated slots in said posts and stringers to permit passage of a leg of said key therethrough;

said legs and said connecting web defining a downwardly opening generally U-shaped anchor slot of a cross width from leg-to-leg substantially equal to but not less than the combined through thickness of said contiguously contacting walls of said posts and said stringers in regions of said overlying and intersecting slots thereof, opposed inside lateral surfaces of said legs lying in substantially parallel planes and abutting outer surfaces of said walls of said posts and stringers;

the length of one of said legs of said key and spacing of said one of said legs from the other leg permitting insertion of said one leg through said intersecting slots of said post and stringers to retain and to secure said posts and stringers firmly together within said U-shaped anchor slot in abutment in braced even contact.

2. In a framing structure for fabricating racks and the like and including:
- a pair of slotted angle irons having overlying contiguous flanges disposed to present superimposed overlapping intersecting slots defining an aperture extending through said flanges, and joinder means for firmly interconnecting said pair of slotted angle irons;
- the improvement wherein said joinder means consists of a high-strength, rigid, deformation-resisting boltless connector extending through said aperture in said flanges of said angle irons, said connector engaging opposed outer surfaces of corresponding said flanges to preclude lateral separation of said flanges from each other,
- said connector comprising a generally h-shaped, load-supporting structural key consisting of spaced parallelly disposed first and second rod-like legs and a transversely extending rod-like cross leg integrally formed with said first and second legs and joining an end of said first leg to said second leg at a position intermediate opposed ends thereof, said legs and said cross leg defining a downwardly opening generally U-shaped anchor slot;
- said cross-leg of said connector extending through said overlapping intersecting slots in said flanges of said angle irons with opposed facing inner surfaces of said parallel first and second legs contacting and firmly abutting opposite outside surface of said contiguous flanges of said angle irons to retain said irons in positive load-supporting engagement.

References Cited

UNITED STATES PATENTS

| | | | |
|---|---|---|---|
| 918,039 | 4/1909 | Grundmann | 211—76 |
| 1,659,988 | 2/1928 | Bloss et al. | 52—466 |
| 1,666,783 | 4/1928 | Kries | 85—5 |
| 2,675,287 | 4/1954 | Sitler | 312—111 |
| 3,003,600 | 10/1961 | MacKenzie | 52—633 |

FOREIGN PATENTS

| | | |
|---|---|---|
| 935,820 | 9/1963 | Great Britain. |

CHANCELLOR E. HARRIS, *Primary Examiner.*

CLAUDE A. LE ROY, *Examiner.*

W. D. LOULAN, *Assistant Examiner.*